(12) United States Patent
Tutton et al.

(10) Patent No.: US 11,073,100 B2
(45) Date of Patent: Jul. 27, 2021

(54) CYLINDER BASED LOW PRESSURE COOLED EXHAUST GAS RECIRCULATION TRANSIENT MEASUREMENT METHODOLOGY

(71) Applicants: Tyler Tutton, Royal Oak, MI (US); William P Attard, Brighton, MI (US)

(72) Inventors: Tyler Tutton, Royal Oak, MI (US); William P Attard, Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 97 days.

(21) Appl. No.: 16/670,584

(22) Filed: Oct. 31, 2019

(65) Prior Publication Data

US 2020/0158042 A1     May 21, 2020

Related U.S. Application Data

(60) Provisional application No. 62/768,256, filed on Nov. 16, 2018.

(51) Int. Cl.
    *F02D 41/00*    (2006.01)
    *F02D 41/24*    (2006.01)
    *F01N 3/02*     (2006.01)

(52) U.S. Cl.
    CPC .......... *F02D 41/2432* (2013.01); *F01N 3/02* (2013.01); *F02D 41/0077* (2013.01)

(58) Field of Classification Search
    CPC ............ F02D 41/2432; F02D 41/0077; F02D 41/2464; F02D 41/1401; F02D 41/0072; F02D 2041/1431; F02D 2041/1454; F02D 2041/0017; F01N 3/02; F01N 2430/06; F01N 2430/08; F01N 2430/10; F01N 2430/00; F01N 2900/1402; F01N 2900/08; F01N 2560/025; F01N 11/007; Y02T 10/40
    See application file for complete search history.

(56) References Cited

U.S. PATENT DOCUMENTS

| | | |
|---|---|---|
| 7,493,762 B2 | 2/2009 | Barbe et al. |
| 8,646,271 B2 | 2/2014 | Yasui et al. |
| 8,794,219 B2 | 8/2014 | Yasui et al. |
| 9,284,909 B2 | 3/2016 | Wooldridge et al. |
| 9,708,974 B2 | 7/2017 | Hilditch et al. |

(Continued)

*Primary Examiner* — Phutthiwat Wongwian
*Assistant Examiner* — Sherman D Manley
(74) *Attorney, Agent, or Firm* — Ralph E. Smith

(57) ABSTRACT

Calibration techniques for forced-induction engines having low pressure cooled exhaust gas recirculation (LPCEGR) systems include commanding an EGR to a fully-closed position, after the EGR valve has reached the fully-closed position, commanding the engine to operate at fixed steady-state conditions for a calibration period, wherein the fixed steady-state conditions comprise at least a fixed throttle valve angle, a fixed injected fuel mass, and a fixed cylinder air/fuel ratio (AFR), during the calibration period, increasingly opening the EGR valve and monitoring a AFR of exhaust gas produced by the engine, calibrating an EGR fraction estimation and EGR transport delay model based on previously measured and/or modeled total engine flow and the monitored exhaust gas AFR during the calibration period, and storing the calibrated model at a memory of a controller of the engine for future usage to improve engine operation.

20 Claims, 3 Drawing Sheets

(56) References Cited

U.S. PATENT DOCUMENTS

| | | | |
|---|---|---|---|
| 10,247,142 B1 | 4/2019 | Wang et al. | |
| 10,344,691 B2 | 7/2019 | Wang et al. | |
| 10,364,764 B2 | 7/2019 | Wang et al. | |
| 2005/0022792 A1* | 2/2005 | Harunari | F02M 26/02 123/478 |
| 2005/0217250 A1* | 10/2005 | Kuboshima | F02D 41/1448 60/287 |
| 2013/0139795 A1* | 6/2013 | Saitoh | F02M 26/49 123/568.16 |
| 2013/0152551 A1* | 6/2013 | Kotnish | F02D 41/029 60/274 |
| 2014/0109554 A1* | 4/2014 | Balthes | F01N 3/2066 60/274 |
| 2014/0251287 A1* | 9/2014 | Takezoe | F02D 41/0052 123/568.11 |
| 2014/0311450 A1 | 10/2014 | Minami et al. | |
| 2015/0260116 A1* | 9/2015 | Odello | F02D 41/0077 123/568.11 |
| 2016/0201589 A1* | 7/2016 | Aoyagi | F02D 41/26 701/108 |
| 2017/0314483 A1* | 11/2017 | Brewbaker | F02D 41/0072 |
| 2017/0363032 A1 | 12/2017 | Rodgers et al. | |
| 2020/0158042 A1* | 5/2020 | Tutton | F01N 11/007 |

\* cited by examiner

US 11,073,100 B2

CYLINDER BASED LOW PRESSURE COOLED EXHAUST GAS RECIRCULATION TRANSIENT MEASUREMENT METHODOLOGY

CROSS-REFERENCE TO RELATED APPLICATION(S)

The present application claims the benefit of U.S. Provisional Application No. 62/768,256, filed on Nov. 16, 2018. The disclosure of the above-referenced application is incorporated herein by reference in its entirety.

FIELD

The present application generally relates to exhaust gas recirculation (EGR) and, more particularly, to techniques for transient measurement of in-cylinder EGR in a forced-induction engine having a low pressure cooled EGR (LPCEGR) system.

BACKGROUND

Exhaust gas recirculation (EGR) involves recirculation at least a portion of the exhaust gas produced by an engine back into an induction system of the engine. EGR is typically used to reduce nitrogen oxide (NOx) emissions, to reduce pumping losses and increase engine efficiency, and/or to reduce knock/auto-ignition. In a low pressure, cooled EGR (LPCEGR) system, exhaust gas is recirculated from a point after a boost device (e.g., a turbine of a turbocharger) through an EGR loop where it is cooled by an EGR cooler and then reintroduced into an induction system at a point before the boost device (e.g., a compressor of the turbocharger). Accurate estimation of the EGR flow and the in-cylinder EGR fraction is critical for engine controls and emissions compliance. The length of the EGR loop in an LPCEGR system, particularly on a forced-induction engine, however, is very long, which results in a large transport delay and decreased EGR fraction estimation accuracy. Conventional in-cylinder EGR fraction estimation techniques are susceptible to drift, sampling speed issues, and limitations to sensor installation locations. Accordingly, while such EGR systems work for their intended purpose, there remains a need for improvement in the relevant art.

SUMMARY

According to one example aspect of the invention, a calibration system for an in-cylinder exhaust gas recirculation (EGR) fraction estimation and EGR transport delay model is presented. In one exemplary implementation, the calibration system comprises: a forced-induction engine comprising a low pressure cooled exhaust gas recirculation (LPCEGR) system and a control system configured to perform a calibration procedure comprising: commanding an EGR valve of the LPCEGR system to a fully-closed position, after the EGR valve has reached the fully-closed position, commanding the engine to operate at fixed steady-state conditions for a calibration period, wherein the fixed steady-state conditions comprise at least a fixed throttle valve angle, a fixed injected fuel mass, and a fixed cylinder air/fuel ratio (AFR), during the calibration period, increasingly opening the EGR valve and monitoring an AFR of exhaust gas produced by the engine, calibrating the model based on previously measured and/or modeled total engine flow and the monitored exhaust gas AFR during the calibration period, and storing the calibrated model at a memory of a controller of the engine, wherein storing the calibrated model causes the controller to utilize the calibrated model during subsequent engine operation to improve engine operation.

In one implementation, the controller is configured to monitor the exhaust gas AFR using an existing oxygen (O2) sensor in an exhaust system of the engine. In one implementation, the controller is configured to calibrate an EGR transport delay portion of the model based on a delay associated with the O2 sensor. In one implementation, the controller is further configured to perform a separate sensor delay determination procedure comprising: commanding a step-change fuel injection pattern comprising a plurality of different injected fuel masses for a plurality of respective periods, during each period, measure a delay for the respective injected fuel mass to be detected by the O2 sensor, based on the plurality of measured delays, determine a final sensor delay for the O2 sensor, and calibrate the EGR transport delay portion of the model based on the final determined sensor delay. In one implementation, the O2 sensor is a wide-range O2 (WRO2) sensor.

In one implementation, the controller is configured to calibrate an in-cylinder EGR fraction estimation portion of the model based on, at each position of the EGR valve, intake valve closing (IVC) timing, exhaust valve opening (EVO) timing, fixed engine airflow corresponding to the fixed throttle valve angle, the fixed cylinder AFR, an EGR flow rate, and known engine volumes. In one implementation, the fixed cylinder AFR is a stoichiometric AFR. In one implementation, the improved engine operation comprises at least one of decreased engine knock, increased engine efficiency or fuel economy, and decreased engine emissions. In one implementation, the control system comprises a dynamometer, and wherein the control system is configured to perform the calibration procedure at a vehicle build-time. In one implementation, the engine does not have an in-cylinder sampling device or an exhaust manifold sampling device for directly measuring EGR amounts.

According to another example aspect of the invention, a calibration method for an in-cylinder EGR fraction estimation and EGR transport delay model for a forced-induction engine having an LPCEGR system is presented. In one exemplary implementation, the method comprises: commanding, by a calibration system, an EGR valve of the LPCEGR system to a fully-closed position, after the EGR valve has reached the fully-closed position, commanding, by the calibration system, the engine to operate at fixed steady-state conditions for a calibration period, wherein the fixed steady-state conditions comprise at least a fixed throttle valve angle, a fixed injected fuel mass, and a fixed cylinder air/fuel ratio (AFR), during the calibration period, increasingly opening, by the calibration system, the EGR valve and monitoring, by the calibration system, an AFR of exhaust gas produced by the engine, calibrating, by the calibration system, the model based on previously measured and/or modeled total engine flow and the monitored exhaust gas AFR during the calibration period, and storing, by the calibration system, the calibrated model at a memory of a controller of the engine, wherein storing the calibrated model causes the controller to utilize the calibrated model during subsequent engine operation to improve engine operation.

In one implementation, monitoring the exhaust gas AFR comprises using an existing O2 sensor in an exhaust system of the engine. In one implementation, calibrating the model comprises calibrating, by the calibration system, an EGR transport delay portion of the model based on a delay associated with the O2 sensor. In one implementation, the method further comprises performing a separate sensor delay determination procedure comprising: commanding, by the calibration system, a step-change fuel injection pattern comprising a plurality of different injected fuel masses for a plurality of respective periods, during each period, measuring, by the calibration system, a delay for the respective injected fuel mass to be detected by the O2 sensor, based on the plurality of measured delays, determining, by the calibration system, a final sensor delay for the O2 sensor, and calibrating, by the calibration system, the EGR transport delay portion of the model based on the final determined sensor delay. In one implementation, the O2 sensor is a wide-range O2 (WRO2) sensor.

In one implementation, calibrating the model comprises calibrating, by the calibration system, an in-cylinder EGR fraction estimation portion of the model based on, at each position of the EGR valve, IVC timing, EVO timing, fixed engine airflow corresponding to the fixed throttle valve angle, the fixed cylinder AFR, an EGR flow rate, and known engine volumes. In one implementation, the fixed cylinder AFR is a stoichiometric AFR. In one implementation, the improved engine operation comprises at least one of decreased engine knock, increased engine efficiency or fuel economy, and decreased engine emissions. In one implementation, the calibration system comprises a dynamometer, and wherein the calibration system is configured to perform the calibration procedure at a vehicle build-time. In one implementation, the engine does not have an in-cylinder sampling device or an exhaust manifold sampling device for directly measuring EGR amounts.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, low pressure, cooled exhaust gas recirculation (LPCEGR) systems for forced-induction engines require accurate estimation of EGR flow and in-cylinder EGR fraction for engine controls and emissions compliance. Accordingly, techniques are presented for a transient measurement methodology for in-cylinder EGR fraction in a forced-induction engine having a LPCEGR system. During an engine/vehicle build period, the engine is run at fixed steady-state conditions with the EGR valve closed. The engine is controlled to stoichiometric fueling or another suitable fixed fueling target. Throttle angle and injected fuel mass are also fixed to allow the engine to maintain a fixed total flow. Then, EGR is introduced and a deviation in the exhaust gas air/fuel ratio (AFR) or lambda is observed. A previously modeled and/or measured total flow and this exhaust gas AFR information are combined to calculate an actual delivered EGR fraction. In some implementations, step changes in injected fuel quantity are performed in a separate test to determine a sensor delay, which is then combined with known valve timing to provide a more accurate estimation of when the external EGR is ingested. Finally, a calibrated model could be constructed and utilized by an engine controller to estimate the in-cylinder EGR fraction and EGR transport delay in real time. Some of the potential benefits of these more accurate estimation methods include decreased engine knock, increased engine efficiency or vehicle fuel economy, and decreased emissions.

Figure 1:
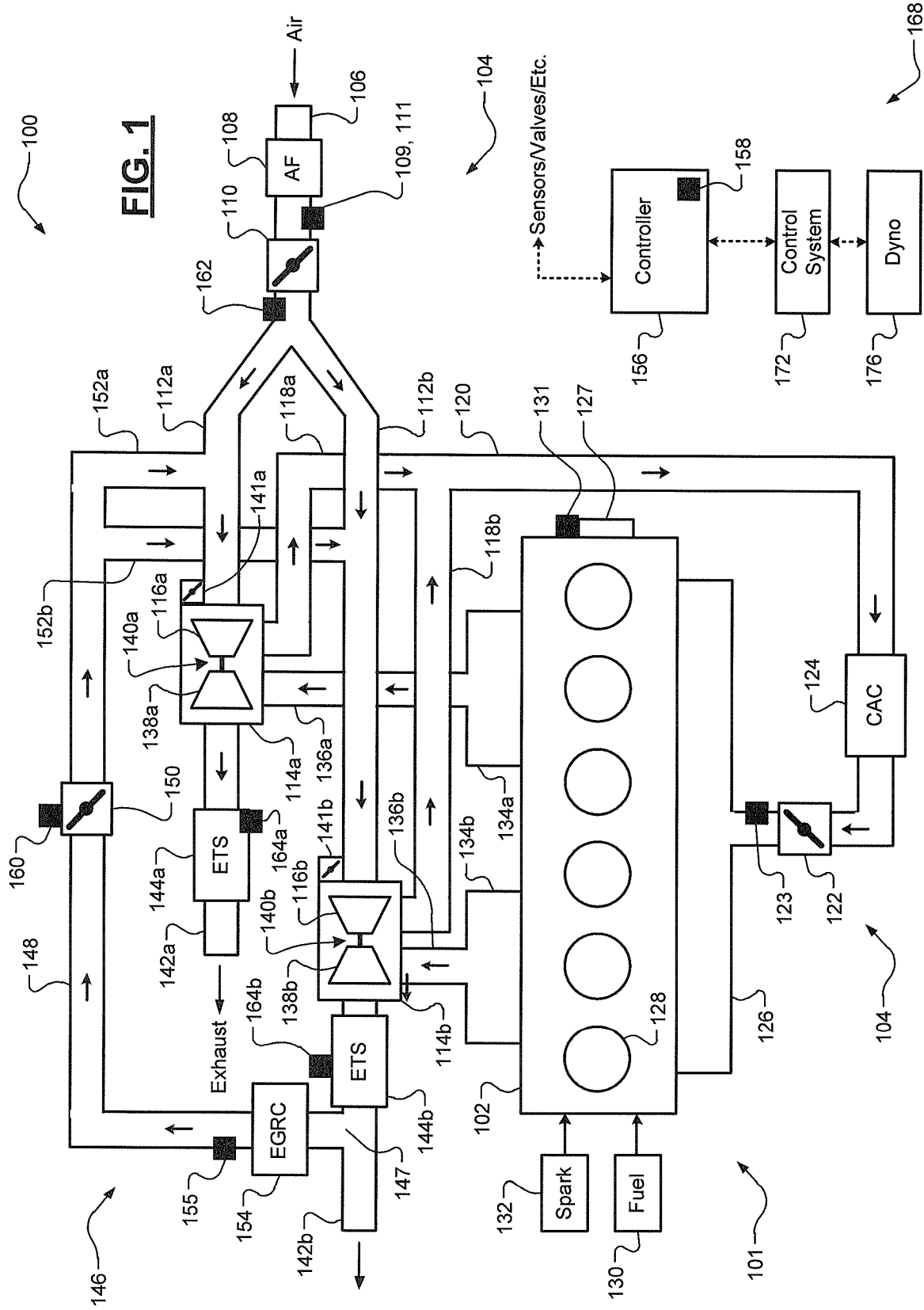
FIG. 1 is a diagram of an example vehicle having a forced-induction engine with a low pressure, cooled exhaust gas recirculation (LPCEGR) system according to the principles of the present disclosure.

Referring now to FIG. 1, an example engine system 101 for a vehicle or vehicle powertrain 100 is illustrated. The engine system 101 includes a gasoline or other suitable internal combustion engine 102 (e.g., a diesel engine) that receives air from an induction system 104. An induction path 106 receives fresh air that is filtered by an air filter (AF) 108. A differential pressure (dP) valve 110 regulates the flow of air through the induction path 106 and a pressure in induction paths 112a, 112b. Turbochargers 114a, 114b comprise compressors 116a, 116b ("compressors 116") that force air/exhaust gas from the induction paths 112a, 112b through induction paths 118a, 118b that converge into a single induction path 120. While two turbochargers 114a and 114b are shown, it will be appreciated that the engine system 101 could have only one turbocharger and associated piping. It will also be appreciated that while turbocharged engine configurations are specifically illustrated and discussed herein, the techniques of the present disclosure could be applicable to any forced-induction engines, such as supercharged engines. A throttle valve 122 regulates the flow of air/exhaust gas through a CAC 124 and into an intake manifold 126. It will be appreciated that the throttle 122 could be implemented upstream from the CAC 124. The air/exhaust gas in the intake manifold 126 is provided to a plurality of cylinders 128 via respective intake valves (not shown), combined with gasoline from a fuel system 130 and combusted, e.g., by spark from spark plugs 132, to drive pistons (not shown) that generate drive torque at a crankshaft 127. While six cylinders are shown, it will be appreciated that the engine 102 could include any suitable number of cylinders (4, 8, etc.). An engine speed sensor 131 measures a rotational speed of the crankshaft 127, also known as a speed of the engine 102.

In one exemplary implementation, the fuel system 130 comprises a fuel tank that houses fuel (gasoline, diesel, etc.), a fuel rail that houses pressurized fuel, fuel injectors that open/close to inject the pressurized fuel into the engine 102, and a fuel pump that pumps the fuel from the fuel tank to the fuel rail to generate the pressurized fuel. The fuel system 130 could also optionally include an evaporative emissions (EVAP) system that captures fuel or "purge" vapor that evaporates from the fuel in the fuel tank and stores it in a vapor canister and provides the fuel vapor to any suitable point in the induction system 104 (e.g., after the dP valve 110) via an EVAP line and a purge valve. Fuel vapor is highly combustible and therefore is able to increase engine power and/or efficiency. Exhaust gas resulting from combustion is expelled from the cylinders 128 via respective exhaust valves (not shown) into exhaust manifolds 134a, 134b. Each exhaust manifold 134a, 134b, for example, could be associated with three of the six cylinders 128. The exhaust gas in exhaust manifold 134a flows through exhaust path 136a and its kinetic energy drives a turbine 138a of turbocharger 114a. The turbine 138a drives compressor 116a via a shaft 140a. Similarly, the exhaust gas in exhaust manifold 134b flows through exhaust path 136b and its kinetic energy drives a turbine 138b of turbocharger 114b, which in turn drives compressor 116b via a shaft 140b. Wastegate valves 141a, 141b regulate turbocharger speed/boost pressure.

The exhaust gas flows from turbines 138a, 138b through exhaust paths 142a, 142b and is treated by exhaust treatment systems (ETS) 144a, 144b to decrease or eliminate emissions before being released into the atmosphere. Non-limiting example components include gasoline particulate filters (GPFs), three-way catalytic converters (TWCs), and mufflers. It will be appreciated that each ETS 144a, 144b could include other exhaust treatment components. A low pressure cooled EGR (LPCEGR) system 146 recirculates exhaust gas from an EGR pickup point 147 downstream of ETS 144b through an EGR path 148 that is regulated by an EGR valve 150. The EGR path 148 splits into separate EGR paths 152a, 152b which direct the exhaust gas to ports in induction paths 112a, 112b downstream of the dP valve 110 and upstream of the compressors 116a, 116b. The LPCEGR system 146 also includes an EGR cooler (EGRC) 154 that cools the exhaust gas. Because turbocharged gasoline engines operate at very high temperatures, cooling of the recirculated exhaust gas could provide for increased performance. A controller 156 controls operation of the engine system 101. It will be appreciated that the term "controller" as used herein refers to any suitable control device or set of multiple control devices that is/are configured to perform at least a portion of the techniques of the present disclosure. Non-limiting examples include an application-specific integrated circuit (ASIC) and one or more processors and a non-transitory memory having instructions stored thereon that, when executed by the one or more processors cause the controller to perform a set of operations. The one or more processors could be a single processor or two or more processors operating in a parallel or distributed architecture.

Optional inlet air temperature and mass air flow (MAF) sensors 109, 111 measure intake air temperature and intake mass air flow. It will be appreciated that these sensors 109, 111 could also be arranged in other suitable positions of the induction system 104. An optional charge air temperature sensor 123 measures ACT at an outlet of the throttle valve 122. An optional EGRC outlet temperature sensor 155 measures a temperature of EGR at an outlet of the EGRC 154. The controller 156 includes a barometric pressure sensor 158 that measures barometric pressure. It will be appreciated that the barometric sensor 158 could be external to the controller 156. An EGR valve delta pressure sensor 160 is disposed proximate to the EGR valve 150 and measures a delta pressure across the EGR valve 150. A dP valve outlet pressure sensor 162 measures a pressure at an outlet of the dP valve 110. As previously mentioned, this dP valve outlet pressure also corresponds to inlet pressures of the compressors 116a, 116b. Lastly, exhaust gas concentration sensors 164a, 164b measure exhaust gas concentration. In one exemplary implementation, the exhaust gas concentration sensors 164a, 164b are WRO2 sensors configured to measure an AFR of the exhaust gas. It will be appreciated that the engine system 101 could include other suitable sensors, such as an exhaust gas or back pressure sensor (not shown), different types of airflow/pressure sensors, and/or different types of oxygen (O2) sensors, such as switching-type O2 sensors. All of these sensors provide their measurements to the controller 156, e.g., via a controller area network (CAN, not shown). The controller 156 is also able to control the various valves and other devices/systems described herein, e.g., via the CAN.

The controller 156 may also configured to implement at least a portion of the techniques of the present disclosure, which are more-fully described in greater detail below. It will be appreciated that at least a portion of the techniques of the present disclosure could be performed by an external calibration system 168, which may or may not comprise the controller 156, although the calibrated model will eventually be uploaded to and stored at a memory of the controller 156 for future usage. This calibration procedure is also described herein as being performed at vehicle build-time or, in other words, while the vehicle 100 is still being built and calibrated and before the vehicle 100 is sold or provided to an end user or consumer. In one exemplary configuration, the calibration system 168 comprises the engine system 101 (including the controller 156) and a separate control system 172. In one exemplary implementation, this separate control system comprises or communicates with a dynamometer 176, which is configured to collect a plurality of measured engine parameters. It will also be appreciated that the separate control system 172 could include other external sensors that are not actually part of the engine system 101 of the vehicle 100, which thereby saves costs as these sensors are not required to be a part of each vehicle 100.

Figure 2A:
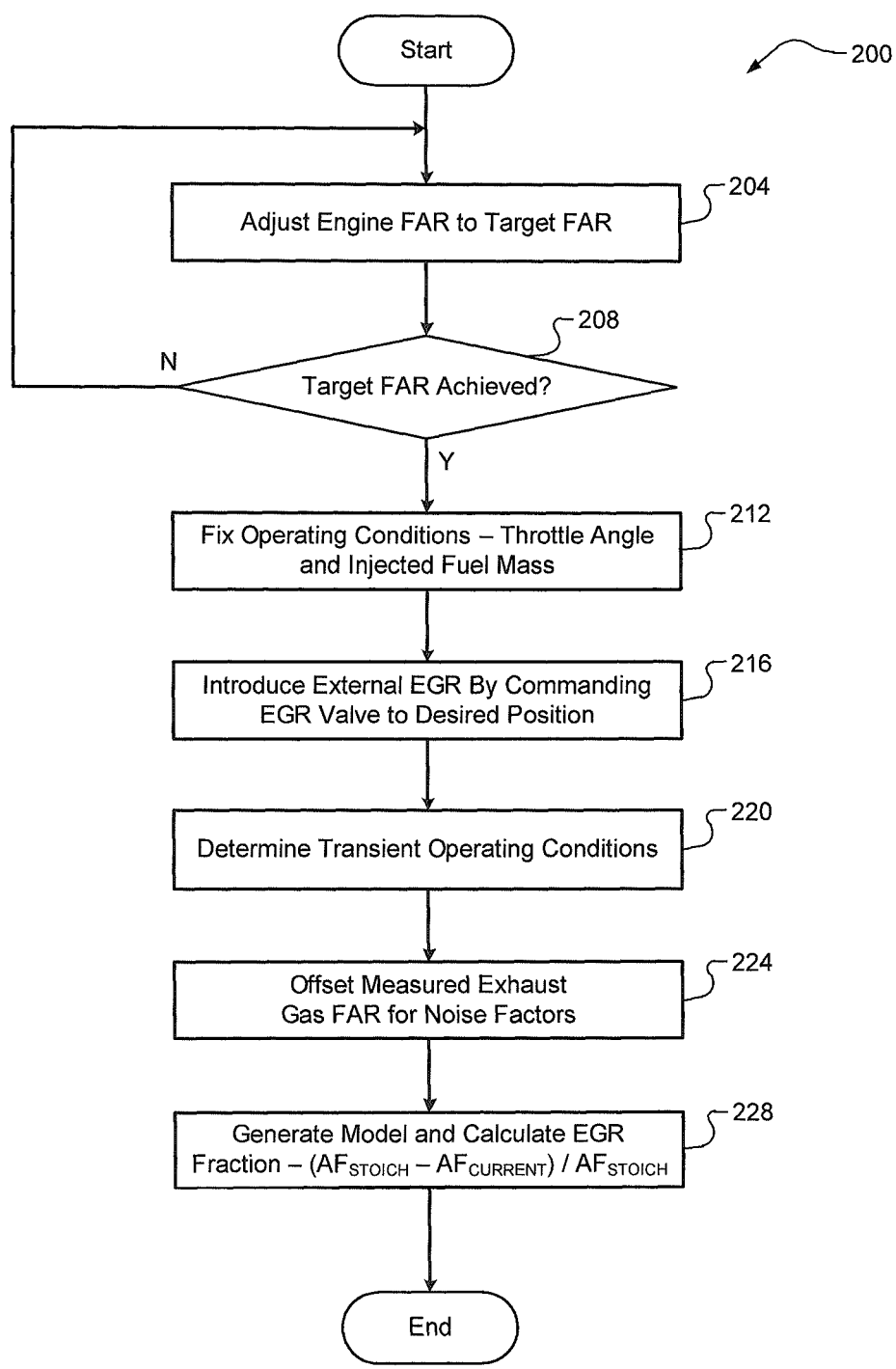
FIGS. 2A-2B are flow diagrams of testing and data processing methods for obtaining dynamometer data for generating a model for estimating the in-cylinder EGR fraction and the EGR transport delay and for verifying the results of the model according to the principles of the present disclosure.

Referring now to FIG. 2A, a flow diagram of a testing method 200 at engine/vehicle build time is illustrated. While described as steps being performed by the controller 156, as mentioned above, at least some of these steps could be performed by an external calibration/control system. At 204, the controller 156 adjusts the engine or cylinder AFR to a target AFR (e.g., a stoichiometric AFR). At 208, the controller 156 determines whether the target AFR has been achieved. When true, the method 200 proceeds to 212. Otherwise, the method 200 returns to 204. At 212, the controller 156 fixes operating conditions including throttle valve angle (throttle valve 122) and injected fuel mass (e.g., a fixed injector pulse width). At 216, the controller 156 gradually introduces external EGR by commanding desired EGR valve position(s) that are at least partially-open. At 220, the controller 156 determines various transient operating conditions, such as, but not limited to, intake valve closing (IVC) timing, exhaust valve opening (EVO) timing, mass air flow or engine air flow (e.g., inferred based on throttle valve angle or measured using the MAF sensor 111), engine/cylinder AFR, EGR flow rate, EGR valve position, and known system volumes (e.g., pipe/tube/chamber diameters/lengths). At 224, the controller 156 offsets the measured exhaust gas AFR (e.g., from sensor 164b) to account for noise factors such as, but not limited to, EGR transport delay, sensor delay, and valve timings. At 228, the controller 156 builds and calibrates a model or calibrates an existing model that is then utilized to calculate/estimate the in-cylinder EGR fraction based on the collected information (also referred to herein as an "in-cylinder EGR fraction estimation portion" of a larger model). For example only, the controller 156 could calculate the in-cylinder EGR fraction as (i) a difference between stoichiometric and current air flow (e.g., measured by sensor 111) divided by (ii) the stoichiometric air flow. The method 200 then ends.

Figure 2B:
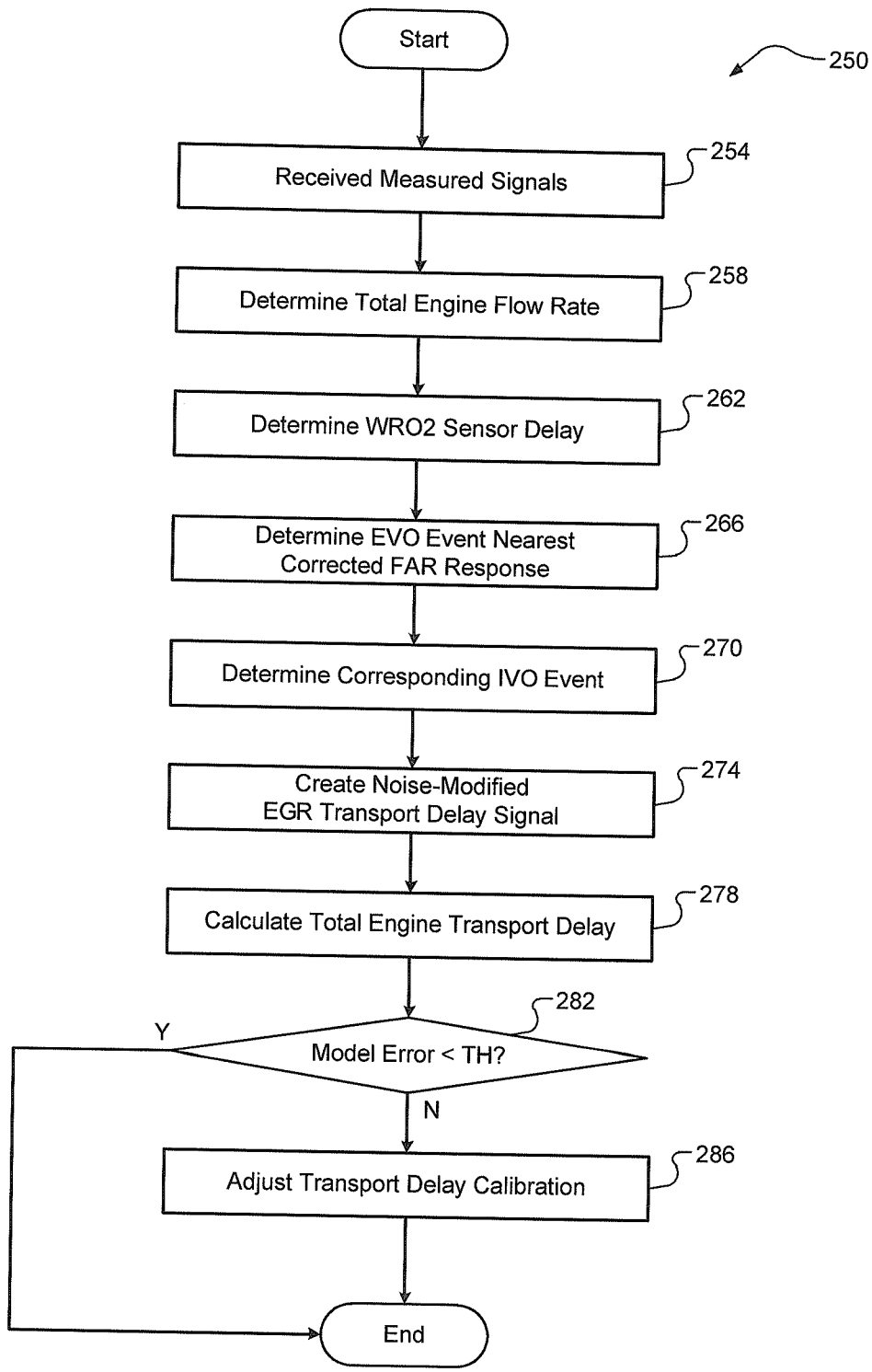

Referring now to FIG. 2B, a flow diagram of an example data processing method 250 is illustrated. This method 250 could be used, for example, to verify the data collected and the model generated by method 200 of FIG. 2A. Again, while described as steps being performed by the controller 156, as mentioned above, at least some of these steps could be performed by an external calibration/control system. At 254, the controller 156 receives measured signals from various sensors of the engine system 101. At 258, the controller 156 determines a total flow rate of air/exhaust in the engine 102 (also referred to herein as "total engine flow"). It will be appreciated that this total engine flow could be measured using any suitable sensors, could be modeled using any suitable models, or could be determined using some combination of measured and modeled parameters. At 262, the controller 156 determines a WRO2 sensor delay (e.g., sensor 164b). In one exemplary implementation, this sensor delay determination procedure further comprises commanding a step-change pattern of a plurality of different injected fuel masses for a plurality of respective periods and determining delays of the WRO2 sensor 164b (i.e., how long it takes for the sensor 164b to see, in the exhaust gas, the change in injected fuel mass) and, based on the plurality of determined delays, determine a final delay for the WRO2 sensor 164b that could then be utilized to calibrate the model (e.g., an EGR transport delay portion of the larger model). At 266, the controller 156 determines the EVO event nearest the corrected AFR response. At 270, the controller 156 determines the corresponding IVO event. At 274, the controller 156 creates a noise modified EGR transport delay signal. At 278, the controller 156 calculates a total transport delay for air/exhaust in the engine 102. At 282, the controller 156 determines whether the model error is less than a threshold (TH) (i.e., within a tolerance range). When false, the controller 156 proceeds to 286 where the EGR transport delay calibration is adjusted. When true, the model accuracy is verified and the method 250 ends.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A calibration system for an in-cylinder exhaust gas recirculation (EGR) fraction estimation and EGR transport delay model, the calibration system comprising:
 a forced-induction engine comprising a low pressure cooled exhaust gas recirculation (LPCEGR) system; and
 a control system configured to perform a calibration procedure comprising:
  commanding an EGR valve of the LPCEGR system to a fully-closed position;
  after the EGR valve has reached the fully-closed position, commanding the engine to operate at fixed steady-state conditions for a calibration period, wherein the fixed steady-state conditions comprise at least a fixed throttle valve angle, a fixed injected fuel mass, and a fixed cylinder air/fuel ratio (AFR);
  during the calibration period, increasingly opening the EGR valve and monitoring an AFR of exhaust gas produced by the engine;
  calibrating the model based on previously measured and/or modeled total engine flow and the monitored exhaust gas AFR during the calibration period; and
  storing the calibrated model at a memory of a controller of the engine, wherein storing the calibrated model causes the controller to utilize the calibrated model during subsequent engine operation to improve engine operation.

2. The calibration system of claim 1, wherein the controller is configured to calibrate an in-cylinder EGR fraction estimation portion of the model based on, at each position of the EGR valve, intake valve closing (IVC) timing, exhaust valve opening (EVO) timing, fixed engine airflow corresponding to the fixed throttle valve angle, the fixed cylinder AFR, an EGR flow rate, and known engine volumes.

3. The calibration system of claim 1, wherein the controller is configured to monitor the exhaust gas AFR using an existing oxygen (O2) sensor in an exhaust system of the engine.

4. The calibration system of claim 3, wherein the controller is configured to calibrate an EGR transport delay portion of the model based on a delay associated with the O2 sensor.

5. The calibration system of claim 3, wherein the controller is further configured to perform a separate sensor delay determination procedure comprising:
 commanding a step-change fuel injection pattern comprising a plurality of different injected fuel masses for a plurality of respective periods;
 during each period, measure a delay for the respective injected fuel mass to be detected by the O2 sensor;
 based on the plurality of measured delays, determine a final sensor delay for the O2 sensor; and
 calibrate the EGR transport delay portion of the model based on the final determined sensor delay.

6. The calibration system of claim 5, wherein the O2 sensor is a wide-range O2 (WRO2) sensor.

7. The calibration system of claim 1, wherein the fixed cylinder AFR is a stoichiometric AFR.

8. The calibration system of claim 1, wherein the improved engine operation comprises at least one of decreased engine knock, increased engine efficiency or fuel economy, and decreased engine emissions.

9. The calibration system of claim 1, wherein the control system comprises a dynamometer, and wherein the control system is configured to perform the calibration procedure at a vehicle build-time.

10. The calibration system of claim 1, wherein the engine does not have an in-cylinder sampling device or an exhaust manifold sampling device for directly measuring EGR amounts.

11. A calibration method for an in-cylinder exhaust gas recirculation (EGR) fraction estimation and EGR transport delay model for a forced-induction engine having a low pressure cooled exhaust gas recirculation (LPCEGR) system, the method comprising:
 commanding, by a calibration system, an EGR valve of the LPCEGR system to a fully-closed position;
 after the EGR valve has reached the fully-closed position, commanding, by the calibration system, the engine to operate at fixed steady-state conditions for a calibration period, wherein the fixed steady-state conditions comprise at least a fixed throttle valve angle, a fixed injected fuel mass, and a fixed cylinder air/fuel ratio (AFR);
 during the calibration period, increasingly opening, by the calibration system, the EGR valve and monitoring, by the calibration system, an AFR of exhaust gas produced by the engine;

calibrating, by the calibration system, the model based on previously measured and/or modeled total engine flow and the monitored exhaust gas AFR during the calibration period; and storing, by the calibration system, the calibrated model at a memory of a controller of the engine, wherein storing the calibrated model causes the controller to utilize the calibrated model during subsequent engine operation to improve engine operation.

12. The method of claim 11, wherein calibrating the model comprises calibrating, by the calibration system, an in-cylinder EGR fraction estimation portion of the model based on, at each position of the EGR valve, intake valve closing (IVC) timing, exhaust valve opening (EVO) timing, fixed engine airflow corresponding to the fixed throttle valve angle, the fixed cylinder AFR, an EGR flow rate, and known engine volumes.

13. The method of claim 11, wherein monitoring the exhaust gas AFR comprises using an existing oxygen (O2) sensor in an exhaust system of the engine.

14. The method of claim 13, wherein calibrating the model comprises calibrating, by the calibration system, an EGR transport delay portion of the model based on a delay associated with the O2 sensor.

15. The method of claim 14, further comprising performing a separate sensor delay determination procedure comprising:

commanding, by the calibration system, a step-change fuel injection pattern comprising a plurality of different injected fuel masses for a plurality of respective periods;

during each period, measuring, by the calibration system, a delay for the respective injected fuel mass to be detected by the O2 sensor;

based on the plurality of measured delays, determining, by the calibration system, a final sensor delay for the O2 sensor, and calibrating, by the calibration system, the EGR transport delay portion of the model based on the final determined sensor delay.

16. The method of claim 15, wherein the O2 sensor is a wide-range O2 (WRO2) sensor.

17. The method of claim 11, wherein the fixed cylinder AFR is a stoichiometric AFR.

18. The method of claim 11, wherein the improved engine operation comprises at least one of decreased engine knock, increased engine efficiency or fuel economy, and decreased engine emissions.

19. The method of claim 11, wherein the calibration system comprises a dynamometer, and wherein the calibration system is configured to perform the calibration procedure at a vehicle build-time.

20. The method of claim 11, wherein the engine does not have an in-cylinder sampling device or an exhaust manifold sampling device for directly measuring EGR amounts.

* * * * *